United States Patent
Xu et al.

(10) Patent No.: US 12,453,690 B2
(45) Date of Patent: Oct. 28, 2025

(54) AQUEOUS SUNCARE FORMULATION

(71) Applicants: Dow Global Technologies LLC, Midland, MI (US); Rohm and Haas Company, Collegeville, PA (US); Dow Silicones Corporation, Midland, MI (US)

(72) Inventors: Wenjun Xu, Phoenixville, PA (US); Isabelle Van Reeth, Incourt Walloon Brabant (BE); Yuanqiao Rao, Berwyn, PA (US)

(73) Assignees: Dow Global Technologies LLC, Midland, MI (US); ROHM AND HAAS COMPANY, Collegeville, PA (US); DOW SILICONES CORPORATION, Midland, MI (US)

(*) Notice: Subject to any disclaimer, the term of this patent is extended or adjusted under 35 U.S.C. 154(b) by 467 days.

(21) Appl. No.: 17/784,134

(22) PCT Filed: Jan. 19, 2021

(86) PCT No.: PCT/US2021/013884
§ 371 (c)(1),
(2) Date: Jun. 10, 2022

(87) PCT Pub. No.: WO2021/150477
PCT Pub. Date: Jul. 29, 2021

(65) Prior Publication Data
US 2023/0034183 A1  Feb. 2, 2023

Related U.S. Application Data

(60) Provisional application No. 62/964,678, filed on Jan. 23, 2020.

(51) Int. Cl.
| | | |
|---|---|---|
| *A61K 8/73* | (2006.01) |
| *A61K 8/35* | (2006.01) |
| *A61K 8/368* | (2006.01) |
| *A61K 8/81* | (2006.01) |
| *A61Q 17/04* | (2006.01) |

(52) U.S. Cl.
CPC ............... *A61K 8/731* (2013.01); *A61K 8/35* (2013.01); *A61K 8/368* (2013.01); *A61K 8/8147* (2013.01); *A61Q 17/04* (2013.01); *A61K 2800/43* (2013.01); *A61K 2800/95* (2013.01)

(58) Field of Classification Search
None
See application file for complete search history.

(56) References Cited

U.S. PATENT DOCUMENTS

| | | |
|---|---|---|
| 2011/0256076 A1 | 10/2011 | Fletcher |
| 2013/0243834 A1 | 9/2013 | Tanner |
| 2015/0202131 A1 | 7/2015 | Britze |
| 2015/0216782 A1 | 8/2015 | Britze |

FOREIGN PATENT DOCUMENTS

| | | | |
|---|---|---|---|
| CN | 103230355 A | 8/2013 | |
| EP | 1579848 A1 * | 9/2005 | ........... A61K 8/0229 |
| EP | 1698641 A1 * | 9/2006 | ............ A61K 8/731 |
| WO | WO-2013033833 A1 * | 3/2013 | ............... A61K 8/64 |
| WO | 2014015879 A2 | 1/2014 | |
| WO | 2018100062 A1 | 6/2018 | |

OTHER PUBLICATIONS

Search Report from corresponding Chinese Application No. 20218001302.5 dated Nov. 13, 2023.
Levdansky, "Sulfation of Microcrystalline Cellulose with Sulfamic Acid in N,N-Dimethylformamide and Diglyme", Journal of Siberian Federal University, Chemistry, 2014, vol. 7, No. 2, pp. 162-169.
Peng, "Chemistry and Applications of Nanocrystalline Cellulose and Its Derivatives: A Nanotechnology Perspective", 2011, vol. 89, pp. 1191-1206.
Xu, "Crystalline Cellulose in Personal Care Applications", Kenneth Mason Publications, 2020, vol. 674, No. 3.

* cited by examiner

*Primary Examiner* — David J Blanchard
*Assistant Examiner* — Sarah J Chickos
(74) *Attorney, Agent, or Firm* — Thomas S. Deibert

(57) ABSTRACT

An aqueous suncare formulation is provided, including: a cosmetically acceptable aqueous carrier; a suncare active; and a sulfated crystalline cellulose SPF booster; wherein the sulfated crystalline cellulose SPF booster both boosts the SPF of the aqueous suncare formulation and thickens the aqueous suncare formulation.

16 Claims, No Drawings

AQUEOUS SUNCARE FORMULATION

The present invention relates to an aqueous suncare formulation. In particular, the present invention relates to an aqueous suncare formulation, comprising: a cosmetically acceptable aqueous carrier; a suncare active; and a sulfated crystalline cellulose SPF booster; wherein the sulfated crystalline cellulose SPF booster both boosts the SPF of the aqueous suncare formulation and thickens the aqueous suncare formulation.

The damaging effects of sunlight on human skin are well documented. Six percent of the solar energy reaching the Earth's surface is ultraviolet (UV) radiation having a wavelength of 290 to 400 nm. This radiation is divided into two components: (i) low energy UVA radiation having a wavelength of 320 to 400 nm and (ii) high energy UVB radiation having a wavelength of 290 to 320 nm. While the UV portion of solar energy is relatively small, it induces nearly 99% of all the side effects from sunlight exposure. High energy UVB radiation, for example, is responsible for producing sunburn, appearance of skin aging and skin cancer. Low energy UVA radiation, for example, is responsible for inducing direct tanning and erythema (abnormal redness) of the skin and contributes to the appearance of skin aging.

By avoiding direct exposure to sunlight, individuals can avoid the serious effects caused by exposure to UV radiation. However, because of the nature of their work, it is challenging for some people to avoid such exposure. In addition, some people voluntarily expose their skin to the sun, e.g., to tan. Therefore, protection against the harmful effects of the sun is important.

Protection from the harmful effects of UV radiation exposure is available in the form of both topically applied formulations containing at least one UV blocker, or at least one UV absorber, or combinations thereof. UV blockers include active ingredients such as, titanium dioxide, zinc oxide and red petrolatum. UV absorbers include active ingredients, such as, paraaminobenzoic acid (more commonly known as PABA), which are generally transparent when applied and act by absorbing UV radiation, offering selective protection against certain UV wave bands, depending on the absorption spectrum of the active ingredient in the formulation.

The effectiveness of a given sunscreen formulation is assessed by how well it protects the skin in terms of a Sun Protection Factor (SPF) which is defined as the ratio of the amount of energy required to produce a minimal erythema on sunscreen protected skin to the amount of energy required to produce the same level of erythema on unprotected skin.

Some of the UV absorbers and UV blockers (e.g., suncare actives) typically used in sunscreen formulations reportedly have adverse toxicological effects and negative sensory effects, which discourage people from using sunscreens. Therefore, it is desirable to reduce the level of suncare actives present in sunscreen formulations without reducing the SPF protection. Accordingly, a variety of SPF boosters have been developed for use in suncare formulations to reduce the level of suncare actives without a reduction in the SPF protection provided. It is also desirable that sunscreen formulations exhibit water resistance and retention of the suncare active ingredients in personal care compositions during use.

Accordingly, there remains a need for new suncare formulations that provide an effective SPF rating while reducing the necessary incorporation level of suncare active and exhibit water resistance and suncare active retention.

The present invention provides an aqueous suncare formulation, comprising: a cosmetically acceptable aqueous carrier; a suncare active; and a sulfated crystalline cellulose SPF booster; wherein the sulfated crystalline cellulose SPF booster both boosts the SPF of the aqueous suncare formulation and thickens the aqueous suncare formulation.

DETAILED DESCRIPTION

We have surprisingly found that sulfated crystalline cellulose effectively boosts the SPF performance of aqueous suncare formulations while simultaneously thickening the aqueous suncare formulation.

Unless otherwise indicated, ratios, percentages, parts, and the like are by weight.

The term "aesthetic characteristics" as used herein and in the appended claims in reference to a suncare formulation refers to visual and tactile sensory properties (e.g., smoothness, tack, lubricity, texture, color, clarity, tubridity, uniformity).

The term "dermatologically acceptable" as used herein and in the appended refers to ingredients that are typically used for topical application to the skin, and is intended to underscore that materials that are toxic when present in the amounts typically found in skin care compositions are not contemplated as part of the present invention.

Preferably, the aqueous suncare formulation of the present invention, comprises: a cosmetically acceptable aqueous carrier (preferably, wherein the aqueous suncare formulation comprises 20 to 92 wt % (preferably, 30 to 90 wt %; more preferably, 75 to 85 wt %), based on weight of the aqueous suncare formulation, of the cosmetically acceptable aqueous carrier); a suncare active (preferably, wherein the aqueous suncare formulation comprises 0.1 to 60 wt % (preferably, 1 to 50 wt %; more preferably, 2.5 to 40 wt %; most preferably, 5 to 10 wt %), based on weight of the aqueous suncare formulation, of the suncare active); and a sulfated crystalline cellulose SPF booster (preferably, wherein the aqueous suncare formulation comprises 0.5 to 20 wt % (preferably, 1 to 7.5 wt %; more preferably, 1.5 to 5 wt %; most preferably, 2 to 4 wt %), based on weight of the aqueous suncare formulation, of the sulfated crystalline cellulose SPF booster); wherein the sulfated crystalline cellulose SPF booster both boosts the SPF of the aqueous suncare formulation and thickens the aqueous suncare formulation.

Preferably, the aqueous suncare formulation of the present invention, comprises a cosmetically acceptable aqueous carrier. More preferably, the aqueous suncare formulation of the present invention, comprises: 20 to 92 wt % (preferably, 30 to 90 wt %; more preferably, 75 to 85 wt %), based on weight of the aqueous suncare formulation, of a cosmetically acceptable aqueous carrier. Most preferably, the personal care formulation of the present invention, comprises 20 to 92 wt % (preferably, 30 to 90 wt %; more preferably, 75 to 85 wt %), based on weight of the aqueous suncare formulation, of a cosmetically acceptable aqueous carrier; wherein the suncare active and the sulfated crystalline cellulose SPF booster are dispersed in the cosmetically acceptable carrier.

Preferably, the aqueous suncare formulation of the present invention, comprises: 20 to 92 wt % (preferably, 30 to 90 wt %; more preferably, 75 to 85 wt %), based on weight of the aqueous suncare formulation, of a cosmetically acceptable aqueous carrier; wherein the cosmetically acceptable aqueous carrier is selected to be capable of evaporating upon application of the aqueous suncare formulation to mammalian skin (preferably, human skin).

Preferably, the aqueous suncare formulation of the present invention, comprises 20 to 92 wt % (preferably, 30 to 90 wt %; more preferably, 75 to 85 wt %), based on weight of the aqueous suncare formulation, of a cosmetically acceptable aqueous carrier; wherein the cosmetically acceptable aqueous carrier is selected from the group consisting of water (e.g., deionized, distilled water); emulsions (e.g., oil-in-water emulsion, water-in-oil emulsion, water-in-silicone emulsion); mixtures of water and alcohols (e.g., $C_{1-4}$ straight or branched chain alcohols such as ethyl alcohol, propyl alcohol, isopropyl alcohol, butyl alcohol); mixtures of water and glycols (e.g., ethylene glycol, propylene glycol, butylene glycol, pentylene glycol, hexylene glycol, dipropylene glycol, ethoxydiglycol); and mixtures of water and natural oils and mineral oils (e.g., sunflower oil, jojoba oil). More preferably, the personal care formulation of the present invention, comprises 20 to 92 wt % (preferably, 30 to 90 wt %; more preferably, 75 to 85 wt %), based on weight of the aqueous suncare formulation, of a cosmetically acceptable aqueous carrier; wherein the cosmetically acceptable carrier includes water (preferably, at least one of deionized water and distilled water; more preferably, deionized, distilled water).

Preferably, the aqueous suncare formulation of the present invention, comprises a suncare active. More preferably, the aqueous suncare formulation of the present invention, comprises: 0.1 to 60 wt % (preferably, 1 to 50 wt %; more preferably, 2.5 to 40 wt %; most preferably, 5 to 10 wt %), based on weight of the aqueous suncare formulation, of a suncare active. Still more preferably, the aqueous suncare formulation of the present invention, comprises 0.1 to 60 wt % (preferably, 1 to 50 wt %; more preferably, 2.5 to 40 wt %; most preferably, 5 to 10 wt %), based on weight of the aqueous suncare formulation, of a suncare active; wherein the suncare active is selected from the group including UV blockers (e.g., red petrolatum, titanium dioxide, zinc oxide) and UV absorbers (e.g., 1-(4-methoxyphenol)-3-(4-tert-butylphenyl)propane-1,3-dione (INCI: avobenzone), 2-hydroxy-4-methoxybenzophenone (INCI: oxybenzone); dioxybenzone; sulisobenzone; menthyl anthranilate; para-aminobenzoic acid; amyl paradimethylaminobenzoic acid; octyl para-dimethylaminobenzoate; ethyl 4-bis(hydroxypropyl) para-aminobenzoate; polyethylene glycol (PEG-25) para-aminobenzoate; ethyl 4-bis(hydroxypropyl)aminobenzoate; diethanolamine para-methyoxycinnamate; 2-ethoxy-ethyl para-methoxycinnamate; ethylhexyl para-methoxycinnamate; octyl para-methoxycinnamate; isoamyl para-methoxycinnamate; 2-ethylhexyl-2-cyano-3,3-diphenyl-acrylate; 2-ethylhexyl-2-cyano-3,3-diphenyl-2-propenoate (INCI: octocrylene); 2-ethylhexyl salicylate (INCI: octisalate); homomenthyl salicylate; glyceryl aminobenzoate; triethanolamine salicylate; digalloyl trioleate; lawsone with dihydroxyacetone; 2-phenylbenzimidazole-5-sulfonic acid; 4-methylbenzylidine camphor; avobenzone; triazines; benzotriazoles; vinyl group-containing amides; cinnamic acid amides; sulfonated benzimidazoles; 3,3,5-trimethylcyclohexyl-2-hydroxybenzoate (INCI: homosalate)). Yet more preferably, the aqueous suncare formulation of the present invention, comprises 0.1 to 60 wt % (preferably, 1 to 50 wt %; more preferably, 2.5 to 40 wt %; most preferably, 5 to 10 wt %), based on weight of the aqueous suncare formulation, of a suncare active; wherein the suncare active comprises a mixture of UV absorbers. Yet still more preferably, the aqueous suncare formulation of the present invention, comprises 0.1 to 60 wt % (preferably, 1 to 50 wt %; more preferably, 2.5 to 40 wt %; most preferably, 5 to 10 wt %), based on weight of the aqueous suncare formulation, of a suncare active; wherein the suncare active is a mixture of UV absorbers including at least one of 1-(4-methoxyphenol)-3-(4-tert-butylphenyl)propane-1,3-dione (INCI: avobenzone); 2-ethylhexyl 2-hydroxybenzoate (INCI: octisalate); 2-ethylhexyl-2-cyano-3,3-diphenyl-2-propenoate (INCI: octocrylene); 3,3,5-trimethylcyclohexyl-2-hydroxybenzoate (INCI: homosalate) and 2-hydroxy-4-methoxybenzophenone (INCI: oxybenzone). Most preferably, the suncare formulation of the present invention, comprises 0.1 to 60 wt % (preferably, 1 to 50 wt %; more preferably, 2.5 to 40 wt %; most preferably, 5 to 10 wt %), based on weight of the aqueous suncare formulation, of a suncare active; wherein the suncare active is a mixture of UV absorbers including 1-(4-methoxyphenol)-3-(4-tert-butylphenyl)propane-1,3-dione (INCI: avobenzone); 2-ethylhexyl-2-cyano-3,3-diphenyl-2-propenoate (INCI: octocrylene) and 3,3,5-trimethylcyclohexyl-2-hydroxybenzoate (INCI: homosalate).

Preferably, the aqueous suncare formulation of the present invention, comprises a sulfated crystalline cellulose SPF booster. More preferably, the aqueous suncare formulation of the present invention, comprises: 0.5 to 20 wt % (preferably, 1 to 7.5 wt %; more preferably, 1.5 to 5 wt %; most preferably, 2 to 4 wt %), based on weight of the aqueous suncare formulation, of a sulfated crystalline cellulose SPF booster. Still more preferably, the aqueous suncare formulation of the present invention, 0.5 to 20 wt % (preferably, 1 to 7.5 wt %; more preferably, 1.5 to 5 wt %; most preferably, 2 to 4 wt %), based on weight of the aqueous suncare formulation, of a sulfated crystalline cellulose SPF booster; wherein the sulfated crystalline cellulose SPF booster has a crystallinity index of ≥0.20 (preferably, 0.25 to 1; more preferably, 0.30 to 0.95; still more preferably, 0.35 to 0.90; most preferably, 0.4 to 0.85). Yet more preferably, the aqueous suncare formulation of the present invention, 0.5 to 20 wt % (preferably, 1 to 7.5 wt %; more preferably, 1.5 to 5 wt %; most preferably, 2 to 4 wt %), based on weight of the aqueous suncare formulation, of a sulfated crystalline cellulose SPF booster; wherein the sulfated crystalline cellulose SPF booster has a crystallinity index, CI, of ≥0.20 (preferably, 0.25 to 1; more preferably, 0.30 to 0.95; still more preferably, 0.35 to 0.90; most preferably, 0.4 to 0.85); and wherein the sulfated crystalline cellulose SPF booster has a primary particle needle shape morphology with an average diameter of 1 to 10 nm and an average length of 50 to 300 nm. Most preferably, the aqueous suncare formulation of the present invention, 0.5 to 20 wt % (preferably, 1 to 7.5 wt %; more preferably, 1.5 to 5 wt %; most preferably, 2 to 4 wt %), based on weight of the aqueous suncare formulation, of a sulfated crystalline cellulose SPF booster; wherein the sulfated crystalline cellulose SPF booster has a crystallinity index, CI, of ≥0.20 (preferably, 0.25 to 1; more preferably, 0.30 to 0.95; still more preferably, 0.35 to 0.90; most preferably, 0.4 to 0.85)(measured as described herein the Examples); wherein the sulfated crystalline cellulose SPF booster has a primary particle needle shape morphology with an average diameter of 1 to 10 nm and an average length of 50 to 300 nm and wherein the sulfated crystalline cellulose SPF booster is spray dried into aggregated particles having an average particle size of 1-200 μm (preferably, 10 to 100 μm) before mixing with the other aqueous suncare formulation components.

Preferably, the aqueous suncare formulation of the present invention, further comprises an optional additive. More preferably, the aqueous suncare formulation of the present invention, further comprises an optional additive, wherein the optional additive is selected from the group consisting of film forming agent, water proofing agents, emollients, preservatives, antioxidants, fragrances, humectants, rheology modifiers, aesthetic modifiers, Vitamins, skin protectants, oils, emulsifiers, surfactants, pearlizers, consistency factors, thickeners, super fatting agents, stabilizers, polymers, silicone compounds, fats, waxes, lectins, phospholipids, color ingredients, propellants and mixtures thereof. Most preferably, the aqueous suncare formulation of the present invention, further comprises an optional additive, wherein the optional additive includes a film forming agent.

Preferably, the aqueous suncare formulation of the present invention, further comprises a film forming agent. More preferably, the aqueous suncare formulation of the present invention, further comprises 0.5 to 7 wt % (preferably, 0.6 to 5 wt %; more preferably, 0.75 to 4 wt %) of a film forming agent; wherein the film forming agent is capable, by itself or in the presence of an auxiliary, of forming a macroscopically continuous film on a support especially on keratin materials (preferably, wherein the film is a cohesive film; more preferably, wherein the film exhibits cohesive properties coupled with sufficient mechanical properties such that the film can be isolated from the support). Most preferably, the aqueous suncare formulation of the present invention, further comprises 0.5 to 7 wt % (preferably, 0.6 to 5 wt %; more preferably, 0.75 to 4 wt %) of a film forming agent; wherein the film forming agent is selected to provide a film barrier upon application of the aqueous suncare formulation of the present invention to skin. The purpose of the film barrier is to help maintain the suncare active on the skin following immersion in water.

Preferred film forming agents include petrolatum, emollient esters, lanolin derivatives (e.g., acetylated lanolins), superfatted oils, silicone gum, silicone elastomer, silicone resin, phenyl functionalized silicones, silicone acrylates, dimethicone derivatives, natural and synthetic oils, fatty acids, fatty alcohols, waxes, acrylic copolymers, polyamides, polyesters, polysaccharides, acrylate polymers and mixtures thereof. Preferably, the aqueous suncare formulation of the present invention, further comprises a film forming agent, wherein the film forming agent includes an acrylates copolymer.

Acrylic copolymers include acrylamide/acrylic copolymers (e.g., Dermacryl® 79 (INCI: Acrylates/Octyacrylamide copolymer) available from National Starch and Chemical); acrylates copolymers (e.g., Epitax™ AC powder water resistant polymer (INCI: acrylates copolymer) available from The Dow Chemical Company).

Certain emollients also exhibit film forming functionality by providing a water-resistant barrier on skin. Emollients with film forming behavior include butyloctyl salicylate (e.g., HallBrite® BHB available form HallStar); fatty acids (e.g., oleic, stearic); fatty alcohols (e.g., cetyl, hexadecyl); esters (e.g., 2,2-dimethyl-1,3-propanediyl diheptanoate (INCI: neopentyl glycol diheptanoate)); alkanes (e.g., mineral oil); ethers (e.g., polyoxypropylene butyl ethers, polyoxypropylene cetyl ethers); natural oils and synthetic oils (including silicone oils).

The aqueous suncare formulation of the present invention are useful for the protection of skin. Preferably, the aqueous suncare formulations of the present invention are useful for the protecting skin from UV damage from exposure to the sun. The aqueous suncare formulations of the present invention also preferably provide moisturization to the skin, prevention and treatment of dry skin, protection of sensitive skin, improvement of skin tone and texture, masking imperfections, and inhibition of trans-epidermal water loss. The aqueous suncare formulations of the present invention can be used in a method for protecting skin from UV damage comprising topically administering the suncare formulation to the skin.

Preferably, the aqueous suncare formulation of the present invention, further comprises: a color ingredient. More preferably, the aqueous suncare formulation of the present invention, further comprises a color ingredient; wherein the color ingredient is selected from the group consisting of inorganic pigments, organic pigments, aqueous pigment dispersions and mixtures thereof. Still more preferably, the aqueous suncare formulation of the present invention, further comprises a color ingredient; wherein the color ingredient is selected from the group consisting of Ext. D&C Yellow No. 2, Ext. D & C Violet No. 2, FD&C Red No. 4, FD&C Red No. 40, FD&C Yellow No. 5, FD&C Yellow No. 6, FD&C Green No. 3, FD&C Blue No. 1, D&C Yellow No. 7, D&C Yellow No. 8, D&C Yellow No. 10, D&C Yellow No. 11, D&C Violet No. 2, D&C Red No. 6, D&C Red No. 7, D&C Red No. 17, D&C Red No. 21, D&C Red No. 22, D&C Red No. 27, D&C Red No. 28, D&C Red No. 30, D&C Red No. 31, D&C Red No. 34, D&C Red No. 33, D&C Red No. 36, D&C Green No. 5, D&C Green No. 6, D&C Green No. 8, D&C Blue No. 4, D&C Orange No. 4, D&C Orange No. 5, D&C Orange No. 10, D&C Orange No. 11, D&C Brown No. 1, Aluminum powder, Annatto, Bismuth citrate, Bismuth Oxychloride, Bronze powder, Caramel, Carmine, β-Carotene, Chromium hydroxide green, Chromium oxide green, Copper chlorophyllin, Copper powder, Dihydroxyacetone, Ferric Ammonium ferrocyanide, Ferric ferrocyanide, Guanine, Iron oxide, Manganese Violet, Mica, Silver, Titanium Dioxide, Ultramarine, Zinc Oxide and mixtures thereof. Still more preferably, the aqueous suncare formulation of the present invention, further comprises a color ingredient; wherein the color ingredient includes at least one iron oxide. Most preferably, the aqueous suncare formulation of the present invention, further comprises a color ingredient; wherein the color ingredient includes a mixture of iron oxides.

Preferably, the aqueous suncare formulation of the present invention, further comprises a color ingredient, wherein the color ingredient is a pigment. More preferably, the aqueous suncare formulation of the present invention, further comprises a color ingredient, wherein the color ingredient is a pigment and wherein the pigment has a surface treatment. Still more preferably, the aqueous suncare formulation of the present invention, further comprises a color ingredient; wherein the color ingredient is a pigment; wherein the pigment has a surface treatment and wherein the surface treatment is formed through treatment of the pigment with a surface treatment agent selected from the group consisting of an alkyl silane, a halogenated phosphonate, a halogenated organosilane or a combination thereof. Most preferably, the aqueous suncare formulation of the present invention, further comprises a color ingredient; wherein the color ingredient is a pigment; wherein the pigment has a surface treatment and wherein the surface treatment is formed through treatment of the pigment with a surface treatment agent selected from the group consisting of sodium perfluorohexylethylphosphonate, triethoxy caprylylsilane, perfluorooctyltriethoxysilane and mixtures thereof.

Rheology modifiers for use in the aqueous suncare formulations of the present invention, include dispersions (e.g., acrylates/steareth-20 methacrylate copolymer), crosslinked acrylamide polymers and copolymers (e.g., Sepigel 305, carbomer), xanthan gum, water-soluble cellulose based thickeners, guar gum, hydroxyethylcellulose, carob gum, scleroglucan gum, gellant gum, carrageenan gum, alginates, maltodextrins, starch and its derivatives, and mixtures thereof.

Emulsifiers for use in aqueous silicone emulsion based cosmetically acceptable aqueous carriers include Lauryl PEG-10 Tris(trimethylsiloxy)silylethyl Dimethicone), Diglyceryl Tris(Trimethylsiloxy)silylethyl Dimethicone, grafted-block or block copolymers comprising at least one block of polyorganosiloxane type and at least one block of a polyether. The polyorganopolysiloxane block may especially be a polydimethylsiloxane or a poly($C_{2-8}$) Alkylmethylsiloxane; the polyether block may be a poly(oxy(C2-C8) alkylene, in particular polyoxyethylene and/or polyoxypropylene. These can also be linear rake or graft type materials, or ABA type where the B is the siloxane polymer block, and the A is the poly(oxyalkylene) group. The poly(oxyalkylene) group can consist of polyethylene oxide, polypropylene oxide, or mixed polyethylene oxide/polypropylene oxide groups. Other oxides, such as butylene oxide or phenylene oxide are also possible. Another type of silicone polyether composition that may be included in the present composition is an ABn polyalkylene oxide silicone copolymers.

Emulsifiers for use in aqueous O/W emulsion based cosmetically acceptable aqueous carriers include: Oxyethylenated and/or oxypropylenated ethers (which may comprise from 1 to 150 oxyethylene and/or oxypropylene groups) of glycerol; oxyethylenated and/or oxypropylenated ethers (which may comprise from 1 to 150 oxyethylene and/or oxypropylene groups) of fatty alcohols (especially of a $C_{8-24}$ and preferably $C_{12-18}$ alcohol), such as oxyethylenated cetearyl alcohol ether containing 30 oxyethylene groups (CTFA name Ceteareth-30) and the oxyethylenated ether of the mixture of $C_{12-15}$ fatty alcohols comprising 7 oxyethylene groups (CTFA name $C_{12-15}$ Pareth-7); fatty acid esters (especially of a $C_{8-24}$ and preferably $C_{16-22}$ acid) of polyethylene glycol (which may comprise from 1 to 150 ethylene glycol units), such as PEG-50 stearate and PEG-40 monostearate; fatty acid esters (especially of a $C_{8-24}$ and preferably $C_{16-22}$ acid) of oxyethylenated and/or oxypropylenated glyceryl ethers (which may comprise from 1 to 150 oxyethylene and/or oxypropylene groups), for instance PEG-200 glyceryl monostearate; glyceryl stearate polyethoxylated with 30 ethylene oxide groups, glyceryl oleate polyethoxy lated with 30 ethylene oxide groups, glyceryl cocoate polyethoxylated with 30 ethylene oxide groups, glyceryl isostearate polyeth oxylated with 30 ethylene oxide groups, and glyceryl laurate polyethoxylated with 30 ethylene oxide groups; fatty acid esters (especially of a $C_{8-24}$ and preferably $C_{16-22}$ acid) of oxyethylenated and/or oxypropylenated sorbitol ethers (which may comprise from 1 to 150 oxyethylene and/or oxypropylene groups), dimethicone copolyol; dimethicone copolyol benzoate; copolymers of propylene oxide and of ethylene oxide, also known as EO/PO polycondensates; and mixtures thereof; saccharide esters and ethers, such as sucrose stearate, sucrose cocoate and sorbitan stearate, and mixtures thereof, fatty acid esters (especially of a $C_{8-24}$ and preferably $C_{16-22}$ acid) of polyols, especially of glycerol or of sorbitol, such as glyceryl stearate, glyceryl stearate, glyceryl laurate, polyglyceryl-2 stearate, sorbitan tristearate or glyceryl ricinoleate.

Preferred propellants for use in the aqueous suncare formulation of the present invention, include methane, ethane, propane, isobutane, n-butane, dimethyl ether, diethyl ether, fluoro containing materials (e.g., 1,1-difluoroethane, ethyl perfluoroisobutyl ether, ethyl perfluorobutyl ether, methyl perfluoroisobutyl ether, methyl perfluorobutyl ether) and mixtures thereof. Preferred fluoro containing propellants include Cosmetic Fluid CF-76 (INCI designation: ethyl perfluorobutyl ether/ethyl perfluoroisobutyl ether) and Cosmetic Fluid CF-61 (INCI designation: methyl perfluorobutyl ether/methyl perfluoroisobutyl ether).

Preferably, the aqueous suncare formulation of the present invention has a pH of 4 to 9. More preferably, the aqueous suncare formulation of the present invention has a pH of 4.5 to 8.5. Still more preferably, the aqueous suncare formulation of the present invention has a pH of 5.0 to 8.0. Most preferably, the aqueous suncare formulation of the present invention has a pH of 5.5 to 7.5.

Preferably, the personal care formulation of the present invention is provided a product form selected from the group consisting of a cream, an aqueous solution, an oil, an ointment, a paste, a gel, a lotion, a milk, a foam, a stick and a suspension.

Optionally, the aqueous suncare formulation of the present invention is formulated for application to skin using a mechanical device (e g, manual pump spray containers, squeeze bottles) or a pressurized aerosol container (e.g., bag-on-nozzle container, pressurized can) to generate a spray.

The aqueous suncare formulation of the present invention is useful for at least one of treating (e.g., moisturizing; protecting from harmful effects of exposure to the sun) and enhancing the appearance of skin through application to the skin. Preferably, the aqueous suncare formulation of the present invention applies easily to the skin.

Some embodiments of the present invention will now be described in detail in the following Examples.

Crystallinity Index

The crystallinity index, CI, values reported in TABLE 1 for the sulfated crystalline cellulose and the microfibrillated cellulose was obtained as follows: A Rigaku SmartLab 3 kW X-ray diffractometer equipped with a Hypix3000 detector was used to collect diffraction patterns. The samples were examined with cobalt $K_\alpha$ radiation (1=1.541 Å) from a sealed-source tube operated at 40 kV and 44 mA. XRD data were collected from 5° to 75° 2q, with a step size of 0.02° and 5 degrees/minute collection time. Analysis of the resulting X-ray diffraction patterns was performed using JADE2010 X-ray pattern analysis software. The crystallinity index=$(1_{200}-I_{am})/(1_{200})$, where $1_{200}$ is the peak intensity of the (200) lattice diffraction, and $I_{am}$ is the peak intensity of amorphous domain diffraction.

Comparative Examples SC1-SC3 and Examples S1-S3: Sunscreen Formulations

Aqueous sunscreen formulations were prepared in each of Comparative Examples SC1-SC3 and Examples S1-S3 having the formulation noted in TABLE 1.

The Phase A components for each of Comparative Examples SC1-SC3 and Example S1 were mixed at 75° C. with mild agitation until dissolved. The Phase B components were mixed together at 75° C. in a separate container. The mixed Phase B components were then slowly added into the mixed Phase A components. The Phase C component was then added into the mixed Phase A and B components. The mixture was then colled to 40° C. with continued agitation. The Phase D component was then mixed in with high shear. The resulting formulation was then homogenized for 3 minutes.

TABLE 1

| Phase | Ingredient INCI name | SC1 | SC2 | SC3 | S1 | S2 | S3 |
|---|---|---|---|---|---|---|---|
| | | \multicolumn{6}{c}{Parts by weight (pbW)} | | | | | |
| A | Deionized Water | \multicolumn{6}{c}{remainder to 100 pbw total} | | | | | |
| A | Alkali-swellable anionic acrylic polymer emulsion[1] | 0.588 | 0.588 | 0.588 | 0.588 | 0.588 | 0.588 |
| A | Butylene glycol | 2.00 | 2.00 | 2.00 | 2.00 | 2.00 | 2.00 |
| A | Polyethylene glycol/poylpropylene glycol 17/6 copolymer[2] | 0.50 | 0.50 | 0.50 | 0.50 | 01.50 | 0.50 |
| A | Tetrasodium EDTA | 0.10 | 0.10 | 0.10 | 0.10 | 0.10 | 0.10 |
| A | Hydroxyacetophenone[3] | 0.50 | 0.50 | 0.50 | 0.50 | 0.50 | 0.50 |
| A | Sulfated crystalline cellulose (Crystallinity Index = 0.56) | — | — | — | 3.00 | 1.50 | 5.00 |
| A | Styrene/Acrylates Copolymer[4] | — | — | 3.00 | — | — | — |
| A | Microfibrillated cellulose (Crystallinity Index = 0.16) | — | 3.00 | — | — | — | — |
| B | ($C_{12-15}$) alkyl lactate | 2.00 | 2.00 | 2.00 | 2.00 | 2.00 | 2.00 |
| B | Stearic acid | 1.50 | 1.50 | 1.50 | 1.50 | 1.50 | 1.50 |
| B | Cetearyl alcohol (and) Ceteareth 20[5] | 1.75 | 1.75 | 1.75 | 1.75 | 1.75 | 1.75 |
| B | Glycerol stearate (and) PEG-100 stearate[6] | 2.00 | 2.00 | 2.00 | 2.00 | 2.00 | 2.00 |
| B | Caprylic/Capric Triglyceride[7] | 5.00 | 5.00 | 5.00 | 5.00 | 5.00 | 5.00 |
| B | $C_{12-15}$ alkyl benzoate[8] | 5.00 | 5.00 | 5.00 | 5.00 | 5.00 | 5.00 |
| B | avobenzone[9] | 3.00 | 3.00 | 3.00 | 3.00 | 3.00 | 3.00 |
| B | octocrylene[9] | 4.00 | 4.00 | 4.00 | 4.00 | 4.00 | 4.00 |
| B | homosalate[9] | 5.00 | 5.00 | 5.00 | 5.00 | 5.00 | 5.00 |
| C | Triethanolamine 99%[10] | 0.85 | 0.85 | 0.85 | 0.85 | 0.85 | 0.85 |
| D | Phenoxyethanol[11] | 0.50 | 0.50 | 0.50 | 0.50 | 0.50 | 0.50 |

[1]Aculyn ™ 38 rheology modifier from The Dow Chemical Company.
[2]Ucon ™ 75-H-450 fluid from The Dow Chemical Company.
[3]SymSav ® H multifunctional cosmetic ingredient from Symrise.
[4]Sunspheres ™ Powder from The Dow Chemical Company.
[5]Procol CS20D from Protameen.
[6]Arlacel 165 from Croda.
[7]Ritamollent CCT from Rita Corp.
[8]Ritamollent TN from Rita Corp.
[9]from DSM.
[10]TEA, 99% from The Dow Chemical Company.
[11]Neolone PH-100 from Dow

In-vitro SPF Measurements

The aqueous suncare formulations prepared according to Comparative Examples SC1-SC3 and Example S1 were each allowed to settle for one week before in-vitro SPF measurements. The in-vitro SPF performance of each of the aqueous suncare formulations was then tested in triplicate using an in-vitro technique according to the following protocol.

The substrate used for the in-vitro SPF measurements was a rough PMMA substrate (6 μm—HD6 available from Schonberg GMBH & Co. KG). The aqueous suncare formulations to be tested were each applied to three separate rough PMMA substrates using a gloved finger to provide a uniform layer of the suncare formulation over the surface of the PMMA substrate at a rate of 1.3 mg/cm². Each deposited layer of aqueous suncare formulation was allowed to rest under ambient conditions in the laboratory for fourteen weeks. The UV absorption of each dried layer of aqueous suncare formulation between 290 nm and 400 nm after heat aging at 45° C. for 1 week, 2 weeks, 9 weeks and 14 weeks was measured at nine (9) separate points using a Labsphere UV-2000S Spectrometer. The SPF boost efficiency was then calculated for each of (MFC) SC2, (SunSpheres™ powder) SC3 and (CNC) S1 relative to the booster free control formulation SC1 using the following equation:

$$SPF \text{ Boost Efficiency} = \frac{(SPF \text{ of } A) - SPF \text{ of } SC1}{SPF \text{ of } SC1}$$

wherein SPF of A is the SPF of formulation SC2, SC3 or 51. The results are provided in TABLE 2.

TABLE 2

| Suncare Formulation | SPF Boost Efficiency | | | |
|---|---|---|---|---|
| | 1 Week | 2 Weeks | 9 Weeks | 14 Weeks |
| SC1 | 0 | 0 | 0 | Not measured |
| SC2 | 0.68 | 0.88 | 0.82 | 0.72 |
| S1 | 0.60 | 0.74 | 0.63 | 1.12 |

The aqueous suncare formulations prepared according to Comparative Examples SC1 and Examples S1-S3 were each allowed to settle for one week before in-vitro SPF measurements. The in-vitro SPF performance of each of the aqueous suncare formulations was then tested in triplicate using an in-vitro technique according to the following protocol. The substrate used for the in-vitro SPF measurements was a rough PMMA substrate (6 μm—HD6 available from Schonberg GMBH & Co. KG). The aqueous suncare formulations to be tested were each applied to three separate rough PMMA substrates using a gloved finger to provide a uniform layer of the suncare formulation over the surface of the PMMA substrate at a rate of 1.3 mg/cm². Each deposited layer of aqueous suncare formulation was allowed to dry for at least 60 minutes under ambient conditions in the laboratory before the SPF measurements. The UV absorption of each dried layer of aqueous suncare formulation between 290 nm and 400 nm was measured at nine (9) separate points using a Labsphere UV-2000S Spectrometer. The in-vitro SPF value for each aqueous suncare formulation prepared according to Comparative Example SC1 and Examples S1-S3 was then calculated based on the results of the UV absorption measurements. The average from the triplicate samples of each aqueous suncare formulation prepared according to Comparative Example SC1 and Examples S1-S3 is reported in TABLE 3.

TABLE 3

| Suncare Formulation | In vitro SPF |
| --- | --- |
| SC1 | 25.13 |
| S1 | 39.73 |
| S2 | 35.88 |
| S3 | 30.18 |

Viscosity

The Brookfield viscosity of the of the aqueous suncare formulations prepared according to Comparative Example SC1 and SC3 and Example S1 were then measured at 30 rpm using a TA Instruments DHR-3 rheometer with an aluminum cup and bob. The results are provided in TABLE 4.

TABLE 4

| Suncare Formulation | Brookfield, 30 rpm (cP) |
| --- | --- |
| SC1 | 12,533 |
| SC3 | 10,800 |
| S1 | 62,900 |

We claim:

1. An aqueous suncare formulation, comprising:
   30 to 90 wt %, based on weight of the aqueous suncare formulation, of a cosmetically acceptable aqueous carrier;
   1 to 50 wt %, based on weight of the aqueous suncare formulation, of a suncare active, wherein the suncare active comprises a mixture of UV absorbers including at least one of 1-(4-methoxyphenol)-3-(4-tert-butylphenyl) propane-1,3-dione; 2-ethylhexyl 2-hydroxybenzonate; 2-ethylhexyl-2-cyano-3,3-diphenyl-2-propenoate; 3,3,5-trimethylcyclohexyl-2-hydroxybenzoate and 2-hydroxy-4-methoxybenzophenone; and
   1 to 7.5 wt %, based on weight of the aqueous suncare formulation, of a sulfated crystalline cellulose SPF booster having a crystallinity index of 0.56;
   wherein the sulfated crystalline cellulose SPF booster both boosts the SPF of the aqueous suncare formulation and thickens the aqueous suncare formulation.

2. The aqueous suncare formulation of claim 1, wherein the suncare active further comprises a UV blocker.

3. The aqueous suncare formulation of claim 2, wherein the UV blocker is selected from the group consisting of red petrolatum; titanium dioxide; and zinc oxide.

4. The aqueous suncare formulation of claim 1, wherein the suncare active is a mixture of UV absorbers including 1-(4-methoxyphenol)-3-(4-tert-butylphenyl) propane-1,3-dione; 2-ethylhexyl-2-cyano-3,3-diphenyl-2-propenoate and 3,3,5-trimethylcyclohexyl-2-hydroxybenzoate.

5. The aqueous suncare formulation of claim 4, further comprises a film forming agent.

6. The aqueous suncare formulation of claim 5, wherein the film forming agent includes a acrylates copolymer.

7. The aqueous suncare formulation of claim 6, further comprising a color ingredient.

8. The aqueous suncare formulation of claim 7, wherein the color ingredient is selected from the group consisting of Ext. D&C Yellow No. 2, Ext. D & C Violet No. 2, FD&C Red No. 4, FD&C Red No. 40, FD&C Yellow No. 5, FD&C Yellow No. 6, FD&C Green No. 3, FD&C Blue No. 1, D&C Yellow No. 7, D&C Yellow No. 8, D&C Yellow No. 10, D&C Yellow No. 11, D&C Violet No. 2, D&C Red No. 6, D&C Red No. 7, D&C Red No. 17, D&C Red No. 21, D&C Red No. 22, D&C Red No. 27, D&C Red No. 28, D&C Red No. 30, D&C Red No. 31, D&C Red No. 34, D&C Red No. 33, D&C Red No. 36, D&C Green No. 5, D&C Green No. 6, D&C Green No. 8, D&C Blue No. 4, D&C Orange No. 4, D&C Orange No. 5, D&C Orange No. 10, D&C Orange No. 11, D&C Brown No. 1, Aluminum powder, Annatto, Bismuth citrate, Bismuth Oxychloride, Bronze powder, Caramel, Carmine, β-Carotene, Chromium hydroxide green, Chromium oxide green, Copper chlorophyllin, Copper powder, Dihydroxyacetone, Ferric Ammonium ferrocyanide, Ferric ferrocyanide, Guanine, Iron oxide, Manganese Violet, Mica, Silver, Titanium Dioxide, Ultramarine, Zinc Oxide and mixtures thereof.

9. An aqueous suncare formulation, comprising:
   30 to 90 wt %, based on weight of the aqueous suncare formulation, of a cosmetically acceptable aqueous carrier;
   2.5 to 40 wt %, based on weight of the aqueous suncare formulation, of a suncare active, wherein the suncare active comprises a mixture of UV absorbers including at least one of 1-(4-methoxyphenol)-3-(4-tert-butylphenyl) propane-1,3-dione; 2-ethylhexyl 2-hydroxybenzonate; 2-ethylhexyl-2-cyano-3,3-diphenyl-2-propenoate; 3,3,5-trimethylcyclohexyl-2-hydroxybenzoate and 2-hydroxy-4-methoxybenzophenone; and
   1.5 to 5 w %, based on weight of the aqueous suncare formulation, of a sulfated crystalline cellulose SPF booster having a crystallinity index of 0.56;
   wherein the sulfated crystalline cellulose SPF booster both boosts the SPF of the aqueous suncare formulation and thickens the aqueous suncare formulation.

10. The aqueous suncare formulation of claim 9, wherein the suncare active further comprises a UV blocker.

11. The aqueous suncare formulation of claim 10, wherein the UV blocker is selected from the group consisting of red petrolatum; titanium dioxide; and zinc oxide.

12. The aqueous suncare formulation of claim 11, wherein the suncare active is a mixture of UV absorbers including 1-(4-methoxyphenol)-3-(4-tert-butylphenyl) propane-1,3-dione; 2-ethylhexyl-2-cyano-3,3-diphenyl-2-propenoate and 3,3,5-trimethylcyclohexyl-2-hydroxybenzoate.

13. The aqueous suncare formulation of claim 12, further comprises a film forming agent.

14. The aqueous suncare formulation of claim 13, wherein the film forming agent includes a acrylates copolymer.

15. The aqueous suncare formulation of claim 14, further comprising a color ingredient.

16. The aqueous suncare formulation of claim 15, wherein the color ingredient is selected from the group consisting of Ext. D&C Yellow No. 2, Ext. D & C Violet No. 2, FD&C Red No. 4, FD&C Red No. 40, FD&C Yellow No. 5, FD&C Yellow No. 6, FD&C Green No. 3, FD&C Blue No. 1, D&C Yellow No. 7, D&C Yellow No. 8, D&C Yellow No. 10, D&C Yellow No. 11, D&C Violet No. 2, D&C Red No. 6, D&C Red No. 7, D&C Red No. 17, D&C Red No. 21, D&C Red No. 22, D&C Red No. 27, D&C Red No. 28, D&C Red No. 30, D&C Red No. 31, D&C Red No. 34, D&C Red No. 33, D&C Red No. 36, D&C Green No. 5, D&C Green No. 6, D&C Green No. 8, D&C Blue No. 4, D&C Orange No. 4, D&C Orange No. 5, D&C Orange No. 10, D&C Orange No. 11, D&C Brown No. 1, Aluminum powder, Annatto, Bismuth citrate, Bismuth Oxychloride, Bronze powder, Caramel, Carmine, β-Carotene, Chromium hydroxide green, Chromium oxide green, Copper chlorophyllin, Copper powder, Dihydroxyacetone, Ferric Ammonium ferrocyanide, Ferric ferrocyanide, Guanine, Iron oxide, Manganese Violet, Mica, Silver, Titanium Dioxide, Ultramarine, Zinc Oxide and mixtures thereof.

* * * * *